May 7, 1935.  N. C. CHRISTENSEN  2,000,661
PROCESS OF MAKING PIGMENTS FROM LEAD ORES
Filed Oct. 12, 1931  3 Sheets-Sheet 1

INVENTOR
Niels C. Christensen
By [signature]
Attorneys

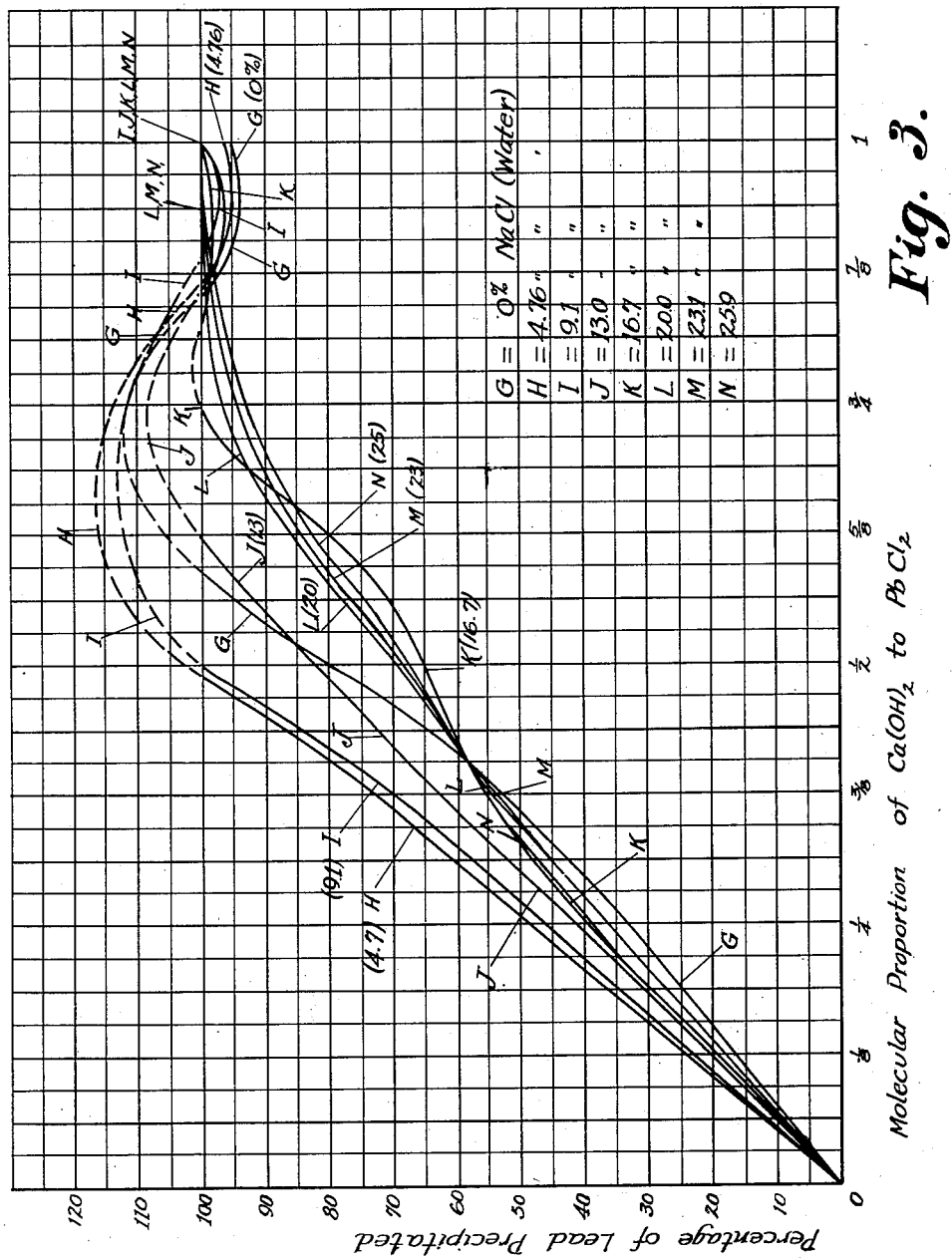

Patented May 7, 1935

2,000,661

UNITED STATES PATENT OFFICE 2,000,661

PROCESS OF MAKING PIGMENTS FROM LEAD ORES

Niels C. Christensen, Salt Lake City, Utah

Application October 12, 1931, Serial No. 568,512

5 Claims. (Cl. 23—127)

This invention relates to the manufacture of white lead pigments, such as the normal or basic carbonates, chlorides, and sulphates, etc., from lead ores and crude lead products. It is especially applicable to the direct manufacture of these lead salts from lead sulphide ores in connection with the brine leaching processes described in my U. S. Patents No. 1,539,711, and others, and from brine leaching processes for the recovery of lead from oxidized ores and from lead products such as lead sulphate. The process avoids the necessity of smelting these ores and products for the recovery of the lead and the necessity of refining the lead bullion before converting the lead into the final products. The process makes these products directly from the ore with a minimum expenditure of time and labor and produces pigments of the highest quality as to tinting strength and hiding power.

Slightly different methods of carrying out the process are described in this application and in the copending applications No. 568,511 and No. 568,513.

Figure 1:
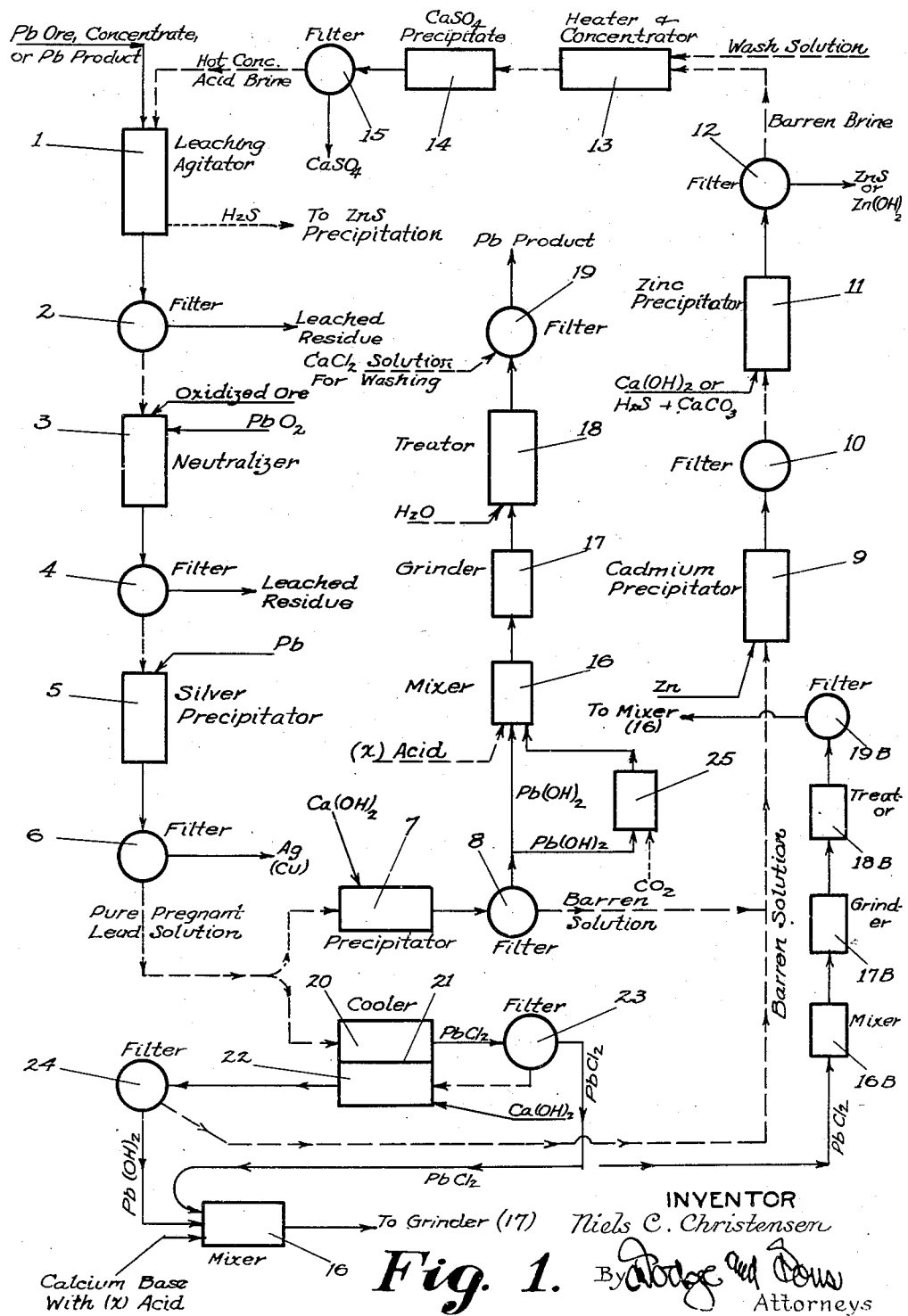
Figure 2:
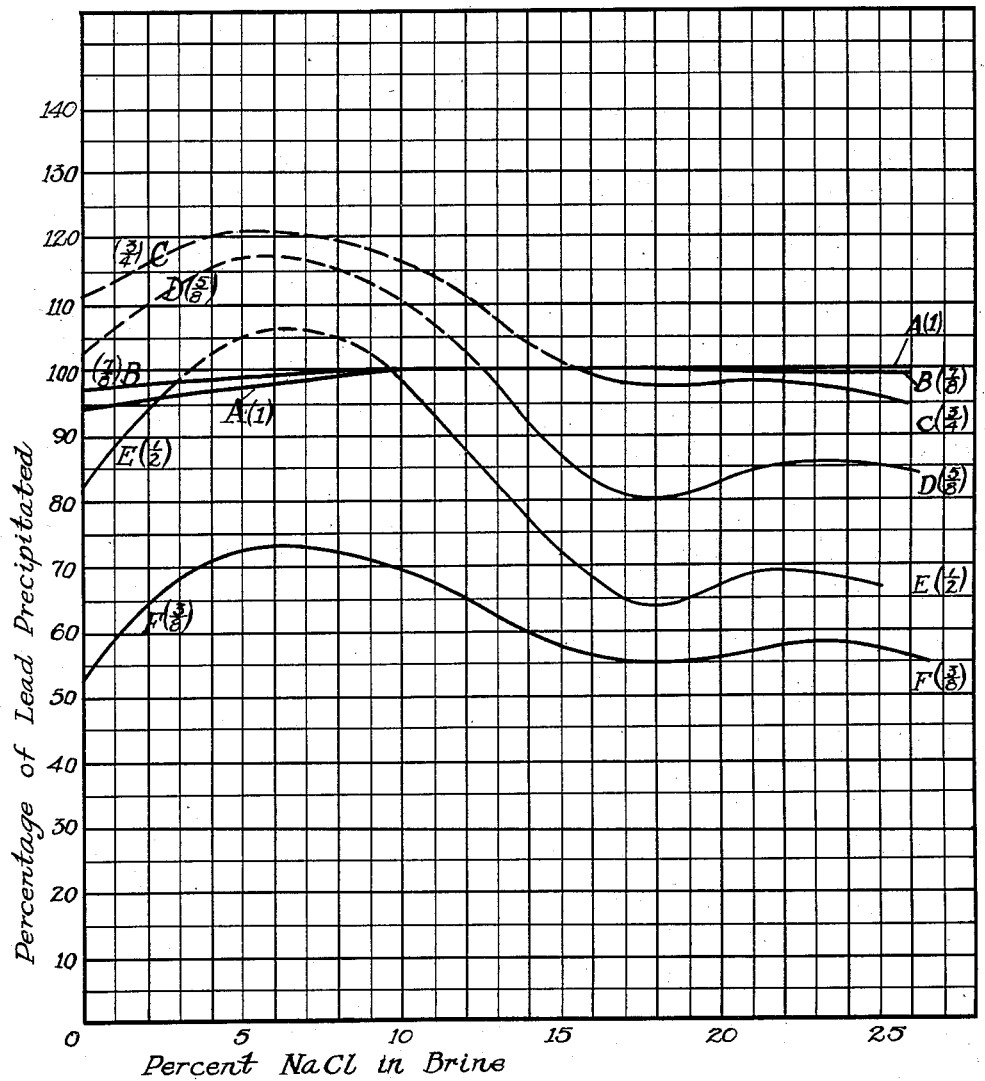

The accompanying drawings illustrate the application of the process to the treatment of lead ores and other lead products, and to the treatment of lead chloride or lead sulphate produced by methods other than those described herein. Figure 1 shows a general flow sheet of the process as applied to the treatment of lead ores and lead products. Fig. 2, consisting of six curves, shows the percentage of the total lead, held in solution as $PbCl_2$ in NaCl brines of varying concentrations, which is precipitated from the hot (substantially boiling) solution by treatment of the solution with different molecular equivalents of $Ca(OH)_2$ to the $PbCl_2$ (the suspension of $Ca(OH)_2$ being stirred into the hot brine and the mixture agitated for 10 minutes). Curve A is for equimolecular proportion of $Ca(OH)_2$ to $PbCl_2$ i. e., 1:1 and curves B, C, D, E and F respectively ⅞, ¾, ⅝, ½, and ⅜ molecular proportions of $Ca(OH)_2$ to one molecular proportion of $PbCl_2$ in solution. Fig. 8 consisting of eight curves shows the percentage of the total lead held in solution in NaCl brines of different concentrations which is precipitated from the hot (substantially boiling) brine by the addition of different molecular proportions of $Ca(OH)_2$ to $PbCl_2$. Curves G, H, I, H, K, L, M, and N are respectively for 1% (water), 4.76%, 9.%, 13.0%, 16.7%, 20.%, 23.1%, and 25.9% NaCl brines respectively.

The general method of carrying out the process for the treatment of lead sulphide ores (or oxidized ore or other lead product as later described), as illustrated in Fig. 1 is briefly as follows: the finely ground lead ore or concentrate (or other lead product) is agitated with a hot concentrated NaCl brine (with hydrochloric acid, if necessary) in the leaching agitator (1). If lead sulphide ore is being treated a slight excess of HCl above, the amount theoretically required, is necessary to dissolve the lead, and the silver in the galena as indicated in the following equation: $PbS + 2HCl = PbCl_2 + H_2S$. To secure a substantially complete extraction of the lead from sulphide ores or concentrates requires from 15 to 45 minutes treatment with an excess of from one half to one percent free HCl in the brine at the end of the treatment. With oxidized ores practically no excess acid is required. The hot pregnant solution is separated from the residue of leached ore in the filter (2) the residual pregnant solution being washed out first with a hot brine wash followed by a water wash. The tailings from this treatment may be floated to recover the residual sulphides such as pyrite, etc., containing the residual silver and gold. The hot pregnant solution carrying the lead and silver and impurities such as zinc, iron, manganese, etc., goes to the neutralizer (3) where the residual $H_2S$ (from the treatment of the sulphide ores only) carried in solution is first oxidized by treatment with a small amount of oxidized ore containing soluble ferric oxide (or other suitable oxidizer $PbO_2$) and the acid thereafter neutralized with lead carbonate or mixed lead zinc carbonate ore which precipitates ferric iron from solution. After this neutralization the ferrous iron and the manganese are removed by agitating the solution with a small excess of the oxidized ore and a suitable oxidizing agent, preferably a solid oxidizer such as $PbO_2$ so that a slight excess may be used without being carried into the next step of the process. The small amount of oxidized ore added in the first step of this treatment dissolves in the excess of acid forming ferric chloride which destroys any $H_2S$ as indicated below:

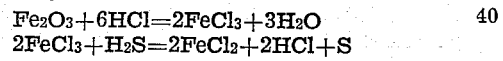

$$Fe_2O_3 + 6HCl = 2FeCl_3 + 3H_2O$$
$$2FeCl_3 + H_2S = 2FeCl_2 + 2HCl + S$$

The excess $FeCl_3$ and residual acid in solution are neutralized in the second step of this treatment as indicated below;

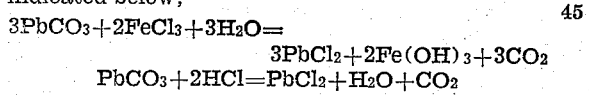

$$3PbCO_3 + 2FeCl_3 + 3H_2O = 3PbCl_2 + 2Fe(OH)_3 + 3CO_2$$
$$PbCO_3 + 2HCl = PbCl_2 + H_2O + CO_2$$

The ferrous iron and manganese in the solution are oxidized and precipitated out of solution in the third step of this treatment as indicated by the following chemical equations by means of lead peroxide and oxidized ore:

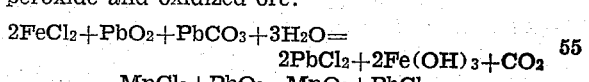

$$2FeCl_2 + PbO_2 + PbCO_3 + 3H_2O = 2PbCl_2 + 2Fe(OH)_3 + CO_2$$
$$MnCl_2 + PbO_2 = MnO_2 + PbCl_2$$

Zinc carbonate ore may be used for this neutralizing step and the zinc may be recovered as a sulphide or hydroxide as later described. This treatment with oxidized ore and oxidizing agent also removes arsenic and other impurities from solution. The residue of oxidized ore and the precipitated impurities are separated from the purified solution in the filter (4).

The pure neutral pregnant solution thus secured, carrying silver, lead, and zinc, and perhaps copper and cadmium, in solution now passes through the silver precipitator (5) in which the silver (and copper) is precipitated and removed by treatment with metallic lead, preferably lead dust, as indicated in the following equation:

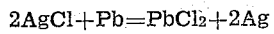

The precipitated silver is separated from the solution in the filter (6).

The lead present in the hot pregnant lead brine from the silver precipitation is now precipitated by one of the two following methods as indicated by the two methods A and B shown on the flow sheet in Fig. 1. In method indicated as A in Fig. 1 the lead is precipitated by adding $Ca(OH)_2$ to the hot pregnant brine in the amount required to substantially completely precipitate the lead as a hydroxide. As will be noted by reference to Figs. 2 and 3 it is not possible to completely precipitate the lead from a hot concentrated NaCl brine as an oxychloride or a hydroxychloride. As shown in curves D, E and F, the hydroxychloride (or hydrated oxychloride) is only formed to any appreciable extent in dilute or relatively dilute brines carrying less than 15% NaCl, and that as shown in curves A, B, C, and G, H, I and J, to secure a practically complete precipitation of the lead from concentrated or relatively concentrated brines it is necessary to use more than ¾ of an equimolecular proportion of $Ca(OH)_2$ to $PbCl_2$ in solution, indicating that there is only a relatively small amount of the hydroxychloride formed in concentrated brines containing more than 17½% to 20% NaCl. As shown in curves D, E and F (and G, H, I) the oxychloride is formed completely and with ease only in solutions containing between 5% and 10% NaCl. As shown in curves B and C, and L, M and N some hydroxy chloride may, however, be found in the concentrated and relatively concentrated brines, since substantially all the lead is precipitated from brines containing over 10% NaCl by seven-eighths of the chemical equivalent of $Ca(OH)_2$, and in brines containing over 15% NaCl by three-quarters of the chemical equivalent of $Ca(OH)_2$. In the making of the pigments described by the method described in the following, the lead is preferably precipitated from the chloride brines by the use of $Ca(OH)_2$ in amount approximately equal to seven-eighths, or slightly less, of the chemical equivalent of $Ca(OH)_2$ to the lead in solution. As low as three-quarters of the chemical equivalent may be used but the proportion stated above is preferred in the making of basic carbonate and basic sulphate, though the larger proportion (seven-eighths) may be used in making the basic chloride (hydroxychloride). The hydroxychloride formed by this process of precipitation remains in the finished product as such and is probably the cause of the superior properties of the basic sulphate and basic carbonate pigments made by this process. The precipitate thus secured from the hot concentrated brines by complete precipitation with $Ca(OH)_2$ in the precipitator (7) is therefore largely lead hydroxide carrying some oxychloride, unused $Ca(OH)_2$ and occluded chlorides. This product is filtered out of the barren lead brine in the filter (8) and treated with suitable acids in water solution to make basic lead salts of the desired composition as more fully described below. Acids, the basic lead salts of which are insoluble, are preferably used in this step.

The solution from the filter (8) carries in solution only zinc and perhaps cadmium and perhaps a trace of lead. These metals (except zinc) are precipitated by means of metallic zinc (preferably zinc dust) in the precipitator (9) and filtered out of the solution in the filter (10). The hot brine now contains only zinc in solution which is removed by precipitation with lime, or as a zinc sulphide by precipitation with $H_2S$ and a suitable lime compound in the precipitator (11) as indicated in the following equations and as described in my U. S. Patents 1,793,906 and 1,886,162

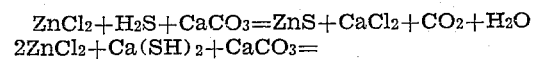

The precipitated $Zn(OH)_2$ or ZnS is filtered out of the solution in the filter (12) and the barren brine is passed through the concentrator (13) together with the wash solutions from the different filtering and washing operations, the mixed solution being thus heated and concentrated for use again in the leaching of more ore. The solution at this point contains $CaCl_2$ equivalent to the acid consumed in dissolving the soluble material in the ore. The acid used in the process is preferably $H_2SO_4$. It may be added to the ore and the brine at the entrance to the agitator (1). The $H_2SO_4$ thus added reacts with the $CaCl_2$ to form HCl in solution and precipitate $CaSO_4$ which is discharged with the leached residue. If desired the $H_2SO_4$ may be added to the concentrated brine in the precipitator (14) before its entrance to the agitator (1) and the precipitated $CaSO_4$ may be recovered from the solution in the filter (15) for use in making gypsum plaster or for other purposes. The hot concentrated acid brine thus formed is used over again in the leaching operation as previously described.

The conversion of the precipitated lead hydroxide product (from the filter 8) to the desired normal or basic lead salts is carried out by the addition of the required amount of the desired acid to the emulsion of the hydroxide in water and by grinding in the presence of water until the desired stable salt is formed. In this way any of the insoluble normal or basic or hydroxy salts of lead may be formed such as the lead hydroxychlorides, and the normal and basic lead sulphates, carbonates, silicates, etc. The manner of carrying out this procedure for some of these products and their characteristics are briefly described below.

To convert the lead hydroxide precipitate from the filter (8) to lead hydroxychloride, it is mixed with sufficient HCl solution in the mixer (16) and then ground in the pebble mill (17) to secure a uniform product after which it is treated with water in the washer or treater (18) to remove any residual $CaCl_2$ and NaCl and form a stable compound and finally filtered on the filter (19). The treater (18) is arranged to treat the ground product in counter-current with water so that the first step of the treatment is the removal of the $CaCl_2$ formed by the first reaction in the grinding operation and the second step is a relatively long time counter-current treatment on water. If desired the $CaCl_2$ formed during the grinding operation may be removed by filtration before the product passes to the treater. The product from the filter may be dried to form a paste as desired.

water at the entrance to the cooler. The PbCl₂ thus precipitated is filtered out of the solution in the filter (23) and the cooled solution passed through the heating section (22) of the heat interchanger and sufficient Ca(OH)₂ is added in this heating operation to precipitate the lead remaining in solution as a hydroxide as previously described for the method A. The lead hydroxide compound is filtered out of the solution in the filter (24) and the lead free brine is then treated for the recovery of the zinc and thereafter mixed with the wash solutions and concentrated and heated for reuse in the process as previously described for the method A, any excess of PbCl₂ precipitated in the cooler (20) may be added to the solution in the heater and precipitator (22) and thus be converted to the hydroxide. The cooling and heating (and precipitating) operations may be carried out in separate apparatus instead of the counter-current heat interchanger (21) as shown, the latter being preferred on account of the saving in heat.

The conversion of the lead chloride and lead hydroxide into the desired basic lead compounds is carried out in the modification claimed in the present case, as follows: A sufficient proportion of the PbCl₂ from the filter (23) to form the normal constituent of the basic compound together with an equimolecular proportion of a calcium salt of the desired acid, or an equivalent mixture of Ca(OH)₂ and the acid, is mixed with the lead hydroxide product from the filter (24) in the mixer (16) and ground with water in pebble mill (17) and agitated with water in the treater (18) and finally filtered on the filter (19) and dried or made into a paste with oil as previously described. The making of the individual pigments is carried out as follows:

In making lead hydroxychloride the PbCl₂ and the Pb(OH)₂ precipitate are mixed in the proper proportion and ground and treated with water as described, the hydroxychloride being formed as indicated in the following equation:

$$PbCl_2 + Pb(OH)_2 = 2Pb(OH)Cl$$

During the treatment any residual lime in the precipitated lead hydroxide product left by the formation of a small amount of hydroxychloride during the precipitation with lime, is converted to the hydroxychloride as indicated below:

$$2PbCl_2 + Ca(OH)_2 = 2Pb(OH)Cl + CaCl_2$$

In making the basic lead sulphate an equivalent of CaSO₄, preferably made in the process as described and coming from the filter (15), is mixed with the PbCl₂ and the Pb(OH)₂ precipitate and ground and treated as described to form the basic sulphates as indicated below:

$$PbCl_2 + CaSO_4 + Pb(OH)_2 = PbSO_4 \cdot Pb(OH)_2 + CaCl_2$$

$$PbCl_2 + CaSO_4 + Pb(OH)_2 = 2PbSO_4 \cdot Pb(OH)_2 + CaCl_2$$

Any residual lime reacts with oxychloride in the lead hydroxide precipitate to form the basic sulphate and CaCl₂ as indicated in the following equation:

$$2Pb(OH)Cl + Ca(OH)_2 + 2PbSO_4 = 2PbSO_4 \cdot Pb(OH)_2 + CaCl_2$$

The basic lead carbonate is made by the use of finely ground CaCO₃ instead of the CaSO₄ as shown in the following chemical equations:

$$2PbCl_2 + 2CaCO_3 + Pb(OH)_2 = 2PbCO_3 \cdot Pb(OH)_2 + 2CaCl_2$$

Residual lime reacts with the oxychloride in the lead hydroxide precipitate being converted into CaCl₂ as indicated below:

$$2Pb(OH)Cl + Ca(OH)_2 + 4PbCO_3 = 2[2PbCO_3 \cdot Pb(OH)_2] + CaCl_2$$

The reaction between the solid calcium salts and the lead chloride, or lead hydroxychloride, is quite rapid in the first stages of the process, but in the later stages becomes relatively very slow and it therefore requires prolonged treatment with water to complete the reaction and bring about the removal of all the residual calcium as calcium chloride. The presence of CaCl₂ or NaCl in any considerable concentration in the water slows up or inhibits this final reaction and fresh water is therefore necessary or preferred, in order to cut down the time of treatment required to remove the residual calcium in the product. This final treatment with water to bring the reaction to completion and to remove residual calcium in the pigment is an essential and important part of the process, since if any considerable amount of calcium salt is left in the pigment, the paint film containing the pigment may be damaged by contact with moisture due to the formation of CaCl₂ in the pigment.

The basic lead salts such as the basic carbonate and basic sulphate formed by the method (B) as described in the foregoing will always contain some hydroxychloride in excess of the amount formed in the precipitation of the lead hydroxide, due to the formation of this salt in treatment in the dilute brines in the pebble mill (17) and treater (18) due to the back reaction which tends to go on in a brine as indicated in the following equations:

$$2Pb(OH)_2 + CaCl_2 = 2Pb(OH)Cl + Ca(OH)_2$$
$$PbSO_4 \cdot Pb(OH)_2 + CaCl_2 = Pb(OH)Cl + CaSO_4$$

The CaSO₄ and Ca(OH)₂ being slightly soluble are removed in the washing operation leaving the insoluble hydroxide behind, the pigments thus formed being thus mixed with a considerable proportion of the oxychloride. This does no harm to the pigment since the hydroxychloride has a much higher tinting strength and hiding power than either the basic sulphate or carbonate, and as previously noted, it is probable that this hydroxychloride gives the pigments produced by this process their superior qualities. However if it is desired to avoid this admixture with the hydroxychloride it is preferable to carry out the method B as follows: The PbCl₂ from the filter (23) is mixed with a chemical equivalent of CaCO₃ or CaSO₄ in the mixer 16B and ground in the pebble mill or grinder 17B and washed with water in the treater (18B) to form the normal salt as indicated in the equations below:

$$PbCl_2 + CaCO_3 = PbCO_3 + CaCl_2$$
$$PbCl_2 + CaSO_4 = PbSO_4 + CaCl_2$$

The normal salt thus formed is filtered out in the filter (19B) and this product is mixed with the lead hydroxide precipitate from the filter (24) in proper proportion in the mixer (16) and ground in the pebble mill (17) and agitated with water in the treater (18) to form the desired basic salts as indicated in the following equation:

The hydroxychloride thus secured is a pure white permanent pigment having a tinting strength and hiding power equal to or better than ZnO. The reactions occurring during this treatment are indicated in the following equations, the principal reaction being as follows:

$$2Pb(OH)_2 + 2HCl = 2Pb(OH)Cl$$

Any small residue of $Ca(OH)_2$ included in the precipitated lead hydroxide due to absorption of chlorides or to the formation of a small amount of hydroxychloride is converted to $CaCl_2$ by the HCl leaving a clean hydroxychloride as indicated in the following equation:

$$Ca(OH)_2 + 2HCl = CaCl_2 + 2H_2O$$

The more basic hydroxychloride, $PbCl_2 \cdot 2Pb(OH)_2$ may be made as described but is not as permanent a pigment as the $Pb(OH)Cl$, as it tends to turn brown upon exposure to light.

The making of lead sulphate or the basic lead sulphates is carried out in the same manner as described above except that the required amount of $H_2SO_4$ instead of HCl is added in the mixer (16). By varying the ratio of $H_2SO_4$ to Pb in the precipitated lead hydroxide product, basic salts or mixtures of any desired composition between the normal sulphate $PbSO_4$ and the more basic sulphate $PbSO_4 \cdot 2Pb(OH)_2$ may be secured. The normal sulphate formed by this neutralization of the lead hydroxide and grinding and treating with water gives a permanent white pigment having substantially the same tinting strength and hiding power as the sublimed white lead or so-called basic sulphate now in common use. The basic sulphate $PbSO_4 \cdot Pb(OH)_2$ is a permanent white pigment having a tinting strength and hiding power considerably superior to the basic white leads now on the market. The more basic sulphate $PbSO_4 \cdot 2Pb(OH)_2$ has a much higher tinting strength and hiding power than the less basic salt but is not as permanent a pigment as it shows a tendency to turn yellow upon exposure to light. The reactions occurring in the manufacture of these sulphate pigments are indicated as follows:

$$2Pb(OH)_2 + H_2SO_4 = PbSO_4 \cdot Pb(OH)_2 + 2H_2O$$

$$3Pb(OH)_2 + H_2SO_4 = PbSO_4 \cdot 2Pb(OH)_2 + 2H_2O$$

Any oxychloride and residual lime in the lead hydroxide precipitate are converted to the sulphate or basic sulphate as indicated in the following equations:

$$2Pb(OH)Cl + Ca(OH)_2 + 2H_2SO_4 = 2PbSO_4 + CaCl_2 + 4H_2O$$

$$4Pb(OH)Cl + Ca(OH)_2 + 2H_2SO_4 = 2PbSO_4 \cdot Pb(OH)_2 + CaCl_2 + 4H_2O$$

and the $CaCl_2$ is washed out in the grinding and treatment with water.

The formation of the lead carbonates and basic lead carbonates is carried out by treating the required proportion of the lead hydroxide precipitate with $CO_2$ in a suitable pulp spray (24) of the type shown in my U. S. Patent 1,452,363 or tumbling barrel (25) and then mixing this carbonated product with the remaining lead hydroxide precipitate in the mixer (16) and grinding the mixture in the pebble mill (17) and treating with water in the treater (18), and thereafter filtering and drying as described. By this method, by varying the proportion of the lead hydroxide precipitate which is carbonated, white lead pigments varying from the normal carbonate to the ordinary basic carbonate $2PbCO_3 \cdot Pb(OH)_2$, (or more basic mixtures) may be secured. The normal carbonate thus prepared has substantially the same tinting strength and hiding power as the basic white leads now on the market, while the basic white lead thus prepared has a much higher tinting strength and covering power than the ordinary white leads now in common use. The salts which are more basic than the basic carbonate $2PbCO_3 \cdot Pb(OH)_2$, are not as permanent as the less basic, having a tendency to turn yellow upon exposure to light. The reactions taking place in the treatment are indicated in the following chemical equations:

$$Pb(OH)_2 + CO_2 = PbCO_3 + H_2O$$

$$Pb(OH)_2 + 2PbCO_3 = 2PbCO_3 \cdot Pb(OH)_2$$

Any oxychloride and excess lime in the precipitated lead hydroxide are converted to the carbonate or basic carbonate as indicated below:

$$2Pb(OH)Cl + Ca(OH)_2 + CO_2 = 2PbCO_3 + CaCl_2 + 2H_2O$$

$$2Pb(OH)Cl + Ca(OH)_2 + 4PbCO_3 = 2 - 2PbCO_3 \cdot Pb(OH)_2 + CaCl_2$$

In the preparation of any of the above described pigments for commercial use, the wet products from the filter (19) may either be dried to secure the dry pigment or may be mixed with the desired amount of oil to form a paste as is a common practice with white lead. The lead hydroxide precipitate used in making the basic lead salts by the method A should be washed free from chlorides as rapidly as possible, before treatment with the different acids to form the basic compounds, since in dilute brines (7½ to 12% NaCl and $CaCl_2$) there is a back reaction tending to form $Pb(OH)Cl$ as indicated in the following equations:

$$2Pb(OH)_2 + CaCl_2 = Pb(OH)Cl + Ca(OH)_2$$

$$PbSO_4 \cdot Pb(OH)_2 + CaCl_2 = 2Pb(OH)Cl + CaSO_4$$

$$2PbCO_3 \cdot Pb(OH)_2 + CaCl_2 = 2Pb(OH)Cl + 2PbCO_3 + Ca(OH)_2$$

This would result in the formation of hydroxychloride somewhat in excess of the amount formed in the precipitation and would slightly increase the amount of hydroxychloride in the final product. Though the small proportion of hydroxychloride in the final products made by this process gives the basic carbonate and basic sulphate their superior properties, the preferred method of treatment consists in securing this hydroxychloride by the use of less than the chemical equivalent of $Ca(OH)_2$ in the precipitation rather than by treatment of the precipitation to cause a reversion to the hydroxychloride during subsequent washing treatment as described above.

The $CaSO_4$ and $Ca(OH)_2$ being slightly soluble are removed in washing leaving the hydroxychloride. The tendency to thus form oxychlorides is much stronger in the case of the basic sulphate than the basic carbonate.

The making of the lead pigments mentioned in the foregoing may also be carried out as indicated in method B of the flow sheet of Figure 1. In this method the clean brine from the silver precipitator (5) is passed through the cooling section (20) of the counter-current heat interchanger (21) and cooled to precipitate $PbCl_2$ from the solution. If necessary to secure sufficient $PbCl_2$ the solution may also be diluted with $$2PbCO_3 + Pb(OH)_2 = 2PbCO_3 \cdot Pb(OH)_2$$
$$PbSO_4 + Pb(OH)_2 = PbSO_4 \cdot Pb(OH)_2$$

By removing the $CaCl_2$ formed in the precipitation of the $Pb(OH)_2$ and normal salts before mixing these and grinding and treating with water to form the basic salts, the amount of hydroxychloride is reduced to a minimum and substantially pure products formed, but this is not the method preferred in this process.

The foregoing description relates primarily to the treatment of sulphide ores of lead but it will be apparent that it is also applicable to the treatment of oxidized or carbonate ores in substantially the same manner, i. e., these ores may be leached with hot acid brine in the leaching agitator (1) and the solution thereafter purified as described and the lead may be recovered from the solution in the manner described and illustrated in the flow sheet of Fig. 1, and may be converted to the desired pigments by either of the methods A or B as described in the foregoing. Lead sulphate or lead chloride from other sources may also be treated in a similar manner by dissolving in the hot brine, which after purification may be treated as described, for the recovery of the lead and manufacture of the desired lead products as described. In the case of the lead sulphate the $CaCl_2$, made in the solution as described by treatment of the $PbCl_2$ with the $Ca(OH)_2$ and other lime salts to form the desired products as described, reacts with the lead sulphate in the concentrated brine to form $PbCl_2$ in solution and to precipitate $CaSO_4$ which may be removed by filtration in the filter (2) following the dissolving of the $PbSO_4$ in the leaching agitator or dissolver (1).

Having described my invention what I claim and desire to patent is:

1. The process of making basic lead pigments from lead ore material in which the lead is recovered from said ores and the like in a chloride brine, which consists in precipitating a portion of the lead from said brine as lead chloride and precipitating another portion of the lead from said brine by adding thereto an amount of calcium hydroxide which is substantially less than chemically equivalent to the lead in said brine, but more than three-quarters of said equivalent, to produce a precipitation of lead hydroxide containing some lead hydroxychloride, and mixing said precipitates in the proper proportion with a calcium salt of an acid of which the normal and basic lead salts are insoluble in amount substantially chemically equivalent to the lead chloride in said mixture, and treating said mixture with water and washing out the $CaCl_2$ formed during said treatment and treating the residual product with more water to remove residual calcium as $CaCl_2$ and form a stable basic lead pigment containing the acid radical of the above said calcium salt.

2. The process of making basic lead pigments from lead ore material in which lead is recovered from said ores and the like in a chloride brine, which consists in precipitating a portion of the lead from said brine as lead chloride and precipitating another portion of the lead from said brine by adding thereto an amount of calcium hydroxide which is substantially less than chemically equivalent to the lead in said brine, but more than three-quarters of said equivalent, to produce a precipitation of lead hydroxide containing some lead hydroxychloride, and mixing said precipitates in the proper proportion with a calcium salt of an acid of which the normal and basic lead salts are insoluble in amount substantially chemically equivalent to the lead chloride in said mixture and grinding said mixture in water and washing out the $CaCl_2$ formed during said treatment and treating the residual product with more water to remove residual calcium as $CaCl_2$ and form a stable basic lead pigment containing the acid radical of said calcium salt.

3. The process of making basic lead carbonate from lead ore material in which lead is recovered from said ores and the like in a chloride brine, which consists in precipitating part of the lead from said brine as lead chloride and precipitating another portion of the lead from said brine by adding thereto an amount of calcium hydroxide which is substantially less than chemically equivalent to the lead in said brine, but more than three-quarters of said equivalent, to produce a precipitation of lead hydroxide containing some lead hydroxychloride, and mixing said precipitates in the proper proportion with a proportion of finely divided calcium carbonate chemically equivalent to the lead chloride in said mixture and treating said mixture with water and washing out the $CaCl_2$ formed during said treatment and treating the residual product with more water to remove residual calcium as $CaCl_2$ and form a stable basic lead carbonate pigment.

4. The process of making basic lead sulphate from lead ore material in which lead is recovered from said ores and the like in a chloride brine, which consists in precipitating a portion of the lead from said brine as lead chloride and precipitating another portion of the lead from said brine by adding thereto an amount of calcium hydroxide which is substantially less than chemically equivalent to the lead in said brine, but more than three-quarters of said equivalent, to produce a precipitation of lead hydroxide containing some lead hydroxychloride, and mixing said precipitates in proper proportion with a proportion of finely divided calcium sulphate chemically equivalent to the lead chloride in first said mixture and treating said mixture with water, and washing out the $CaCl_2$ formed during said treatment and treating the residual product with more water to remove residual calcium as $CaCl_2$ and form a stable basic lead sulphate pigment.

5. The process of making lead precipitate containing hydroxychloride from lead ore material in which lead is recovered from said ores and the like in a chloride brine, which consists in precipitating part of the lead from said brine as lead chloride and precipitating another portion of the lead from said brine by adding thereto an amount of calcium hydroxide which is substantially less than chemically equivalent to the lead in said brine, but more than three-quarters of said equivalent, to produce a precipitation of lead hydroxide containing some lead hydroxychloride, and mixing said precipitates in the proper proportion and treating said mixture with water to remove residual calcium as $CaCl_2$ and form a stable pigment which contains lead hydroxychloride.

NIELS C. CHRISTENSEN.

Certificate of Correction

Patent No. 2,000,661.                                                                                      May 7, 1935.

It is hereby certified that errors appear in the printed specification of the above numbered patent requiring correction as follows: Page 1, first column, line 44, for "8" read *3*; page 2, second column, line 48, for "emulsion" read *suspension*; and page 3, first column, line 46, strike out the formula and insert instead—

$$2\ Pb\ (OH)_2 + H_2\ SO_4 = Pb\ SO_4 \cdot Pb\ (OH)_2 + 2H_2O;$$

and that the said Letters Patent should be read with these corrections therein that the same may conform to the record of the case in the Patent Office.

Signed and sealed this 18th day of June, A. D. 1935.

[SEAL]                                                                                      LESLIE FRAZER,
                                                                                      *Acting Commissioner of Patents.*